June 30, 1970 A. GABOR 3,518,554

DETECTION OF DOUBLE TRANSITION RECORDING

Filed May 22, 1967

INVENTOR
ANDREW GABOR
BY Fred Jacob
ATTORNEY

United States Patent Office 3,518,554
Patented June 30, 1970

3,518,554
DETECTION OF DOUBLE TRANSITION RECORDING

Andrew Gabor, Bedford, Mass., assignor to Honeywell Inc., Minneapolis, Minn., a corporation of Delaware Filed May 22, 1967, Ser. No. 640,126
Int. Cl. H03k 3/02, 5/20
U.S. Cl. 328—63 12 Claims

ABSTRACT OF THE DISCLOSURE

A techinque for detecting double transition recorded data which is substantially insensitive to any local phase shift of the input pulses, e.g. such as may occur due to pulse recording at high densities, but which responds rapidly to velocity fluctuations of the medium bearing the record. Input pulses, which are well behaved with respect to phase shift, are derived at least once for each readout of a predetermined number of successive data cells, all other pulses being excluded by the use of suitable strobing pulses. The resultant synchronizing pulses are then employed to control the timing in the generation of the aforesaid strobing pulses, as well as of output clock pulses. The strobing pulses further gate the input pulses to derive output data pulses whose utilization is effected by means of the output clock pulses.

Background of the invention

Figure 1:
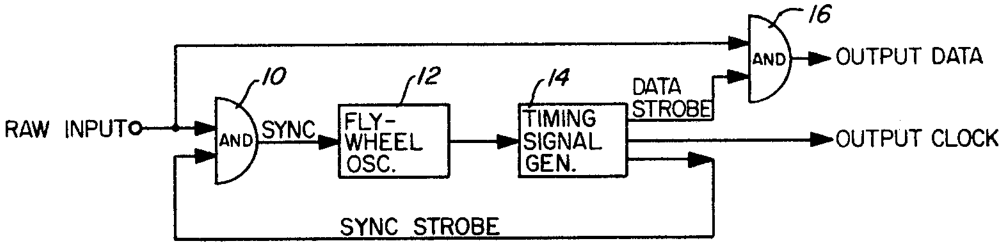

Double transition recording, which includes phase encoding the equivalent frequency encoding, is the predominant method of magnetically storing digital pulse information in present day mass memories. In phase encoding, the polarity of each recorded transition is representative of the digit stored in a given data cell, an additional transition being required between each pair of like digits. In frequency encoding, mandatory pulses are required at the cell boundaries. Optional pulses, selectively representative of either a binary ONE or a binary ZERO, occur in the center of a data cell.

With the increasing demand for higher storage capacities it becomes desirable, without reducing the margins of reliability, to operate at packing densities upward of 3000 bits per inch where severe pulse crowding normally occurs. One of the effects of pulse crowding is inter-symbol interference, which may manifest itself during readout as an apparent shift of pulse position. This phase shift of the pulses, which has long been observed at high pulse packing densities, makes discrimination between nominally long and short time intervals difficult, or in extreme cases, impossible. Such phase shift may also be due to different causes, for example, it may occur as a result of a local area of degraded performance on the recording medium.

The problem is further compounded by commonly occurring timing variations due to velocity fluctuations of the recording medium, which are difficult to distinguish from the localized phase shifts described above. For example, the velocity of a disc on which pulses are magnetically recorded at high densities, may vary as the load on the driving motor varies. When information recorded under these conditions is read out, the detector is faced with the difficult task of discriminating between a phase shift of the information read out due to velocity fluctuations and a phase shift of a local nature, e.g. due to pulse crowding or degraded performance.

A known technique of dealing with these difficulties involves the use of a frequency-tracking, phase-locked oscillator during readout. Continually synchronized by the readout pulses, this so-called fly wheel oscillator is used as a timing reference in lieu of the readout pulses themselves, which are subject to instantaneous timing fluctuations for the reasons described above. One important attribute of such an oscillator is its time constant, i.e. the length of time required for it to "forget" old instructions and to respond to new inputs. In present day systems, this time constant is subject to conflicting requirements. In order for the oscillator to be "up-to-date" on fluctuations due to changes in velocity of the recording medium so that no error will result from a lag in tracking, the time constant should remain small. On the other hand, a short time constant implies that the oscillator is too easily swayed by local fluctuations, i.e. by a local pulse phase shift, which may be due to pulse crowding, or perhaps to a locally degraded performance of the medium.

Such detection techniques as are presently in use, make a properly balanced choice when faced with the aforesaid problem. This involves a compromise wherein the sum of the frequency and phase tracking errors is made a minimum. The magnitude of the residual tracking error which results from this compromise presents a problem in present day recording systems which operate at the very highest packing densities. It will certainly not be acceptable in future systems, which will demand greatly improved performance.

Accordingly, it is the primary object of the present invention to provide a technique for detecting double transition recorded data, wherein the residual tracking error is minimized without a corresponding reduction in the reliability of readout.

It is another object of the present invention to provide a technique for detecting double transition recorded data, which is completely responsive to velocity fluctuations of the recording medium, but which is substantially insensitive to a local phase shift of the pulses read out from the medium.

It is a further object of the present invention to provide a detector for double transition recorded data wherein, for each readout of a predetermined number of successive data cells, at least one pulse is derived which is not subject to local phase shift and where, with the aid of a fly wheel oscillator which is able to respond rapidly to velocity fluctuations of the recording medium, such pulses alone are used to synchronize the generation of timing pulses.

Summary of the invention

In accordance with the present invention, each readout of information from a predetermined number of successive data cells on the recording medium provides at least one well behaved input pulse, i.e. a pulse whose phase shift is sufficiently small so as to exclude local phase fluctuations. Successive well behaved input pulses so derived are employed to synchronize a fly wheel oscillator. The latter has a very low time constant which enables it to respond rapidly to substantially all velocity fluctuations of the recording medium. The fly wheel oscillator output is employed to generate strobing pulses, which are used to gate the pulses read out from the medium. The flywheel oscillator output is further employed to generate output clock pulses, which are adapted to serve as a time reference for the utilization of the ultimately derived output data pulses.

Figure 2:
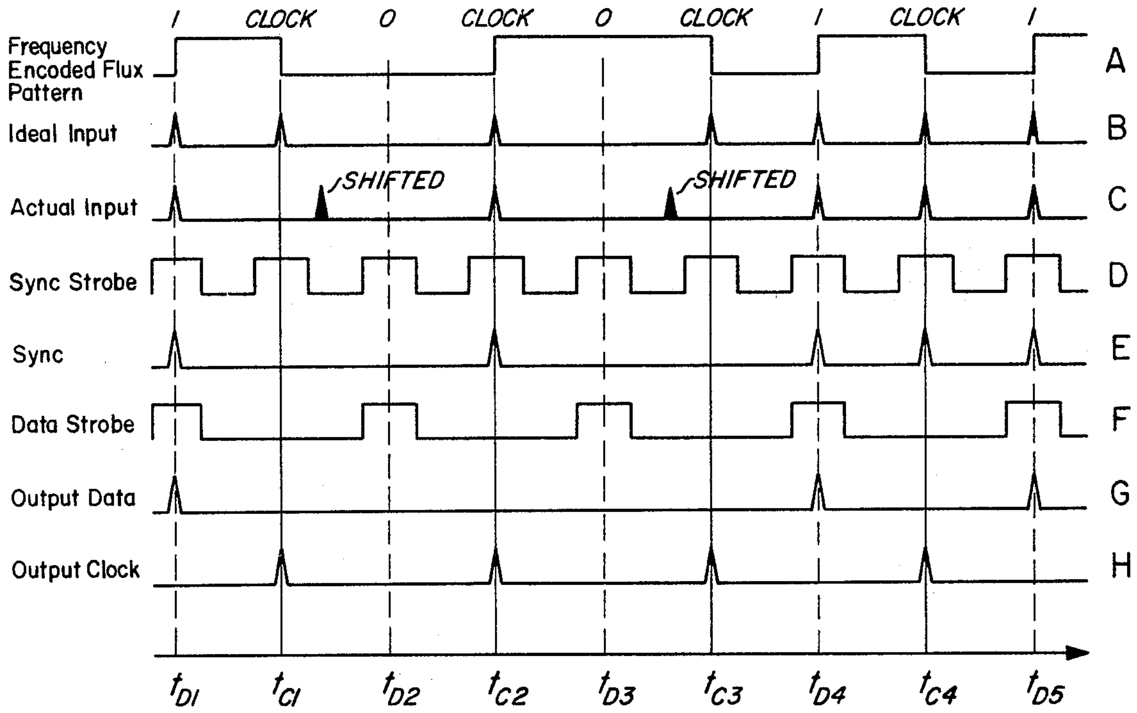

These and other objects of the present invention, together with the features and advantages thereof, will become apparent from the following detailed specification when read in conjunction with the accompanying drawings in which:

FIG. 1 illustrates a preferred implementation of the invention in block design form; and FIG. 2 shows pertinent waveforms which illustrate the operation of the apparatus of FIG. 1.

The principle underlying the present invention may be understood by recognizing certain characteristics of a typical readout signal obtained from double transition recorded data. The invention will be explained using the terminology of frequency encoding. Because of the equivalence that exists between frequency and phase encoding, the discussion is equally applicable to both techniques.

With reference now to the drawings, waveform A in FIG. 2 illustrates a frequency encoded flux pattern as it may be recorded on a magnetic medium. The waveform is seen to contain a train of mandatroy transitions (clocks), repeated at regular nominal time intervals, which define the boundaries of successive data cells. The first data cell, only part of which is shown in FIG. 2, therefore extends to the nominal clock time $t_{C1}$. The secon cell extends from the nominal clock time $t_{C1}$ to nominal clock time $t_{C2}$ and so forth. As shown, data transitions are inserted or omitted at the cell mid-points to represent a binary ONE or a binary ZERO respectively.

Waveform B illustrates raw input pulses which are ideally derived when the recorded flux pattern shown in waveform A is read out. While neighboring transitions in waveform A alternate in polarity, the polarity itself has not data significance in frequency encoding. Thus, although pulses of both polarities are read out, they are subsequently reduced to the same polarity and are used in that form. According, the ideal input pulses shown in waveform B are represented as pulses of only a single polarity.

Waveform C of FIG. 2, illustrates the raw input pulses which are actually derived upon the readout of waveform A and they are similarly illustrated as single polarity pulses. As shown, the first clock pulse lags the nominal clock time $t_{C1}$, while the third clock pulse illustrated has a leading phase shift with respect to the nominal clock time $t_{C3}$. Heretofore, such phase shift was observed to have an erratic dependence on the pattern of the recorded data, but was considered to occur in a random manner. The present invention is predicated upon the recognition of the following rules, which in fact govern such a phase shift:

(1) A pair of pulses, whether directly adjacent or separated by other pulses, mutually repel each other if derived from transitions of opposite polarity.

(2) A pair of pulses derived from transitions of the same polarity mutually attract each other.

(3) The magnitude of the attraction or repulsion is a symmetrical function of distance and diminishes rapidly with separation.

It follows from these rules that:

(a) The interaction between pulses one time slot apart, (i.e. separated by the length of one data cell, e.g. from $t_{C1}$ to $t_{C2}$), is much greater than that between pulses separated by two or more time slots. As a practical matter, the interaction beyond two time slots is negligible.

(b) Pulse shift cancellation can and does occur and a well behaved pulse, i.e. a pulse which has a tolerable amount of phase shift from its nominal time of occurrence, is created when a pulse is in a position of symmetry with respect to its vicinity. Experience indicates that a pulse is well behaved when its two immediate neighbors are at equal nominal distances.

(c) An ill behaved pulse may be defined as a pulse which has a large amount of phase shift with respect to its nominal time of occurrence. Such a pulse is present when it is preceded and succeeded respectively, by dissimilar information.

In frequency encoding a data pulse is always symmetrically surrounded by two clock pulses, the latter being mandatory. Accordingly, data pulses, whenever present, are always well behaved. Under the assumed conditions, a clock pulse is well behaved if the two data cells it separates contain similar information and it is shifted if the two cells contains dissimilar bits. However, if two adjacent cells contain dissimilar bits, one of those bits must be a ONE. As such, it is a data pulse which is always well behaved. Thus, there is always at least one well behaved pulse in every adjacent pair of data cells. By similar reasoning it can be shown that the number of consecutive shifted, i.e. ill behaved, pulse can never exceed two and that in any long train pulses at least one third of all the pulses are well behaved.

In waveform C of FIG. 2, the data pulses, i.e. the pulses representative of a binary ONE which occur at the data times $t_{D1}$, $t_{D4}$ and $t_{D5}$, are well behaved for the reason that they are symmetrically disposed with respect to their neighboring clock pulses. This is similary true for the clock pulses which occur at times $t_{C2}$ and $t_{C4}$. The earlier one of these clock pulses divides two data cells, each of which contains a binary ZERO. The later one of these clock pulses appears between two data pulses, both of which are representative of a binary ONE.

The clock pulse which lags the nominal clock time $t_{C1}$ is seen to be repelled from the data pulse that occurs at time $t_{D1}$ for the reason that the transistions at times $t_{D1}$ and $t_{C1}$ in waveform A are of opposite polarity. The same reasoning holds with respect to the clock pulse which leads the nominal time clock $t_{C3}$. It will be further noted that at least one well behaved pulse is derived from any pair of successive data cells, cf. the pulse at time $t_{C2}$ in the interval $t_{C1}$ to $t_{C3}$. The longest time interval without an occurrence of such a pulse extends for 1.5 data cells.

As is to be expected, the magnitude of the phase shift of well behaved and of ill behaved pulses will vary with the resolution of readout, which itself is a function of pulse packing as well as of the material of the magnetic medium. Resolution is commonly expressed as a percentage of the amplitude of the pulse which would be read out in the absence of any attenuation. Table 1 compares computed worst-case phase shift values of ill behaved and well behaved pulses for a range of resolution figures that is practical at the present state of the art.

TABLE 1

| Resolution, percent | Pulse shift, percent of time slot: Ill behaved | Well behaved |
|---|---|---|
| 50 | 16.6 | .47 |
| 41.5 | 18.5 | .92 |
| 38.2 | 19.3 | 1.28 |
| 34 | 20 | 1.7 |
| 30 | 20.4 | 2.4 |

It is evident that there is a large variation over the resolution range under consideration. At a resolution of 50%, the phase shift for ill behaved pulses is approximately 35 times that of well behaved pulses, while at a resolution of 30% the ratio is approximately 8.5 to 1. The present invention, by recognizing the principles which govern the occurrence of well behaved pulses, takes advantage of this disparity and discriminates between well behaved, ill behaved pulses in a simple and reliable manner.

A preferred implementation of the subject invention is illustrated in block diagram form in FIG. 1. Raw input pulses, corresponding to those shown in waveform C of FIG. 2, are applied to one input of an AND gate 10. Synchronizing strobing pulses are applied to a second input of the AND gate 10 at the nominal data and clock times. As shown by waveform D in FIG. 2, the width of the latter pulses is chosen to exclude ill behaved pulses. Reference to Table 1 above indicates that the synchronizing strobing pulses, at a resolution of 30%, must bracket a maximum phase shift of 2.4% of the data cell in order to discriminate against ill behaved pulses. At higher resolutions, the portion of the bit cell which must be bracketed is obviously smaller.

Thus, well behaved input pulses are readily recognized with the present invention and they alone are used to provide synchronizing pulses at the output of the gate 10. The latter pulses are illustrated by waveform E in FIG. 2 and are employed to synchronize a fly wheel oscillator 12. Fly wheel oscillators as such, are well known in the art and need not be described in detail here. As pointed out above, a phase-locked oscillator, whose time constant represents a compromise between frequency and phase tracking errors, is conventionally used for this purpose. In the present embodiment of the invention, only well behaved pulses, which are derived at intervals no greater than two bit cells apart, are used to synchronize the oscillator. Since the oscillator itself is not called on to discriminate against local phase fluctuations, its time constant can be made very small. This enables the oscillator to respond quickly to changes occasioned by velocity fluctuations of the medium, while operating substantially independently of phase shifts due to localized conditions, such as pulse crowding.

The desired timing signals are derived from a timing signal generator 14 which is responsive to the output of the fly wheel oscillator 12. One of the timing signals obtained at the output of the generator 14 provides the above-discussed synchronizing strobing pulses. As explained before, these occur at the nominal data and clock times respectively, and they bracket only the occurrence of well behaved pulses. Another signal which is derived at the output of the timing signal generator 14 is illustrated in waveform F of FIG. 2 and contains data strobing pulses which occur only at the nominal data times. As previously pointed out data pulses, when they are present, are always well behaved since they are symmetrically surrounded by a pair of mandatory clock pulses. Accordingly, the maximum required width of the data strobing pulses for different resolution figures is prescribed by Table 1 for well behaved pulses.

The data strobing pulses are applied to one input of an AND gate 16, whose other imput receives the aforesaid raw imput pulses. Output data pulses are derived at the output of gate 16. As shown by waveform G of FIG. 2, these occur only at the nominal data times. The timing signal generator 14 further provides output clock pulses, which occur only at the nominal clock times, as shown by waveform H of FIG. 2. The output clock pulses are ultimately employed in a well known manner in the utilization of the aforesaid output data pulses.

Well behaved pulses, as defined above, occur when a pulse is symmetrically situated with respect to its immediate neighbors. By this criterion, only first order asymmetry is considered and interference from pulses located two or more time slots away is disregarded. If the present trend toward ever higher magnetic recording densities continues, applications in the foreseeable future may require the extension of the inventive concept to include the consideration of interference resulting from higher than first order asymmetry.

As stated above, in every pair of consecutive data cells there is at least one pulse persent that is not subject to first order asymmetry. It can be shown that in every three data cells of double transition-recorded data there is at least one pulse present which is not subject to first or second order asymmetry. A refinement of the present invention is advantageously based on the recognition of this principle when dealing with resolution figures significantly inferior to those in common use today. Such an extension of the subject invention may also become important in cases where a system, which normally operates with relatively good resolution, goes through a local area of degraded performance on the medium.

Table 2 below compares worst case phase shift values of ill behaved pulses as a function of resolution, against the phase shift of pulses having only first order symmetry, as well as against pulses which have both first and second order symmetry.

TABLE 2

| Resolution, percent | Ill behaved, percent | Pulse shift, percent of time slot: First order | First and Second order |
|---|---|---|---|
| 50 | 16.6 | 0.47 | 0 |
| 41.5 | 18.5 | 0.92 | .01 |
| 38.2 | 19.3 | 1.28 | .01 |
| 34 | 20 | 1.7 | .02 |
| 30 | 20.4 | 2.4 | .03 |
| 25.3 | 20.7 | 3.4 | .06 |
| 22 | 20.6 | 4.7 | .12 |
| 18.5 | 20.2 | 6.5 | .25 |
| 15.3 | 19.4 | 9.8 | .5 |
| 12.2 | 18 | 12.7 | 1 |

From a consideration of the table above, it appears that well behaved pulses with only first order symmetry may, in extreme cases, fall outside the width of a strobe window which is sufficiently narrow to carry out a reliable discrimination between well behaved and ill behaved pulses. The ratio of the phase shift between ill behaved pulses and pulses having only first order symmetry is approximately 8.5 to 1 at a resolution of 30%. Below that resolution figure the ratio diminishes, until the two phase shifts become comparable and ill behaved pulses can no longer be distinguished from pulses having only first order symmetry.

As appears from Table 2, even at low resolution values pulses having both first and second order symmetry fall within a strobe window sufficiently narrow to discriminate against ill behaved pulses. A comparison of the worst case phase shift of the latter pulses with the phase shift of pulses having both first and second order symmetry shows the ratio to be sufficiently large to permit reliable discrimination between such pulses. Thus, at a resolution of 30%, the phase shift ratio between these pulses is of the order of 6,800 to 1, as compared to 8.5 to 1 for first order symmetry only. At a resolution of 12.2%, the ratio decreases to a value of 18 to 1, which is still adequate for reliable discrimination.

At least one pulse having both first and second order symmetry is derived from every three data cells. The apparatus substantially as illustrated in FIG. 1 may be employed to implement the extension of the present invention for use at very high packing densities. It will be clear that in such an arrangement the synchronizing strobing pulses may be considerably narrower than is permissible for operation under only first order symmetry conditions, and that the response time of the fly wheel oscillator will be correspondingly reduced. Accordingly, such a system will respond rapidly to velocity fluctuations of the recording medium, while retaining its substantial immunity to local phase fluctuations.

While the present invention has been illustrated and described with respect to frequency encoded data, it is applicable to all double transition recorded digital data. The various components which are shown in block diagram form in the preferred implementation of FIG. 1, such as the AND gates, the fly wheel oscillator and the timing signal generator, are themselves well known in the art and they have been treated in the specification only in terms of their respective functions. It will also be apparent that timing considerations may alter the implementation of FIG. 1 in immaterial respects. For example, in actual practice it may well be necessary to delay the raw input pulses before applying them to the AND gates 10 and 16 respectively. The respective delay periods may also differ, depending on the particular operating conditions.

From the foregoing disclosure it will be apparent that numerous modifications, departures, substitutions and equivalents may now occur to those skilled in the art, all of which fall within the true scope and spirit contemplated by the present invention.

What is claimed is:

1. Apparatus for detecting input pulses derived at least once per data cell from the readout of data which is double transition recorded in successive ones of said data cells on a record, said input pulses being either well behaved or ill behaved with respect to phase shift from the nominal clock and data times respectively of their occurrence, said apparatus comprising:

a timing signal generator, means for deriving first strobing pulses from said generator at said nominal clock and data times respectively adapted to bracket only the occurrence of well behaved ones of said input pulses at such times, means for deriving second strobing pulses from said generator at said nominal data times adapted to bracket only the occurrence of said well behaved input pulses at the last-recited times, means for gating said input pulses with said first strobing pulses to derive at least one synchronizing pulse from each readout of a predetermined number of successive data cells, a fly wheel oscillator coupled between said gating means and said timing signal generator and having a time constant sufficiently low to respond rapidly to substantially all velocity fluctuations of the medium which holds said record, said oscillator being responsive to said synchronizing pulses to actuate said timing signal generator substantially independently of any local input pulse phase shift of the kind which characteristically gives rise to said ill behaved pulses, means for gating said input pulses with said second strobing pulses to provide output data pulses, and means for deriving output clock pulses from said timing signal generator adapted to serve as a nominal clock time reference for the utilization of said output data pulses.

2. The apparatus of claim 1 wherein said strobing pulses bracket a maximum phase shift of said input pulses of 2.4% of the length of said data cells at a resolution of readout no less than 30%.

3. The apparatus of claim 2 wherein at least one synchronizing pulse is derived from every pair of successive data cells.

4. The apparatus of claim 1 wherein said strobing pulses bracket a maximum phase shift of said input pulses of 1% of the length of said data cells at a resolution of readout no less than 12.2%, at least one synchronizing pulse being derived from every three successive data cells.

5. Apparatus for reading out double transition recorded binary data from the successive bit cells of a magnetic record, comprising:

means for deriving input pulses corresponding to said transitions, said input pulses being either well behaved or ill behaved with respect to phase shift from the nominal clock and data times respectively of their occurrence, a timing signal generator, means for deriving first strobing pulses from said generator at said nominal clock and data times respectively having a width adapted to bracket the maximum phase shift of only well behaved input pulses occurring at such times, means for deriving second strobing pulses from said generator at said nominal data times having a width adapted to bracket the maximum phase shift of only well behaved input pulses occurring at said last-recited times, means for gating said input pulses with said first strobing pulses to derive at least one synchronizing pulse from each readout of a predetermined number of successive bit cells, a fly wheel oscillator coupled between said gating means and said timing signal generator and having a time constant sufficiently low to respond rapidly to substantially all velocity fluctuations of the medium which holds said record, said oscillator being responsive to said synchronizing pulses to actuate said timing signal generator at said clock and data times respectively, substantially independently of any local input pulse phase shift of the kind which characteristically gives rise to ill behaved pulses, means for gating said input pulses with said second strobing pulses to derive output data pulses, and means for deriving output clock pulses from said timing signal generator adapted to serve as a nominal clock time reference for the utilization of said output data pulses.

6. The apparatus of claim 5 wherein said binary data is frequency recorded such that mandatory translations occur at the bit cell boundaries and optional transitions occur substantially at the bit cell centers.

7. The apparatus of claim 5 wherein said binary data is phase recorded such that a transition occurs substantially at the center of each bit cell having a polarity which determines the bit represented, and a transition separates successive like bits.

8. The apparatus of claim 5 wherein said strobing pulses bracket a maximum phase shift of said input pulses of 2.4% of the length of said bit cells at a resolution of readout no less than 30%, at least one synchronizing pulse being derived from each pair of successive bit cells.

9. The apparatus of claim 5 wherein said strobing pulses bracket a maximum phase shift of said input pulses of 1% of the length of said bit cells at a resolution of readout no less than 12.2%, at least one synchronizing pulse being derived from every three successive bit cells.

10. A method of interpreting input pulses derived at least once per data cell from the readout of data which is double transition recorded in successive ones of said data cells, said input pulses being either well behaved or ill behaved with respect to phase shift from the nominal clock and data times of their occurrence, comprising the steps of:

generating first strobing pulses at said clock and data times respectively of a width adapted to bracket only the occurrence of well behaved pulses at such times, generating second strobing pulses at said data times of a width adapted to bracket only the occurrence of well behaved pulses at said last-recited times, generating at least one synchronizing pulse in time coincidence with a first strobing pulse for each occurrence of a predetermined number of input pulses, controlling the timing of said strobing pulses with said synchronizing pulses in a manner substantially independent of any local phase shift of said input pulses, generating output data pulses from said input pulses in time coincidence with said second strobing pulses, and generating output clock pulses in dependence on said synchronizing pulses adapted to serve as a nominal clock time reference for the utilization of said output data pulses.

11. The method of claim 10 wherein said strobing pulses bracket a maximum phase shift of said input pulses of 2.4% of the length of said data cells at a resolution of readout no less than 30%, at least one synchronizing pulse being derived from each pair of successive data cells.

12. The method of claim 10 wherein said strobing pulses bracket a maximum phase shift of said input pulses of 1% of the length of said data cells at a resolution of readout no less than 12.2%, at least one synchronizing pulse being derived from every three successive data cells.

References Cited

UNITED STATES PATENTS

| | | | |
|---|---|---|---|
| 3,226,568 | 12/1965 | Samwel | 307—218 |
| 3,390,284 | 6/1968 | Carothers et al. | 307—269 |
| 3,418,585 | 12/1968 | Harnett | 307—218 X |

JOHN S. HEYMAN, Primary Examiner

U.S. Cl. X.R.

328—74, 110